J. S. GROVES, Jr.
AUTOMATIC CLUTCH RELEASE FOR MOTOR VEHICLES.
APPLICATION FILED JUNE 25, 1915. RENEWED SEPT. 18, 1917.
1,259,228.
Patented Mar. 12, 1918.
3 SHEETS—SHEET 1.
FIG. 1
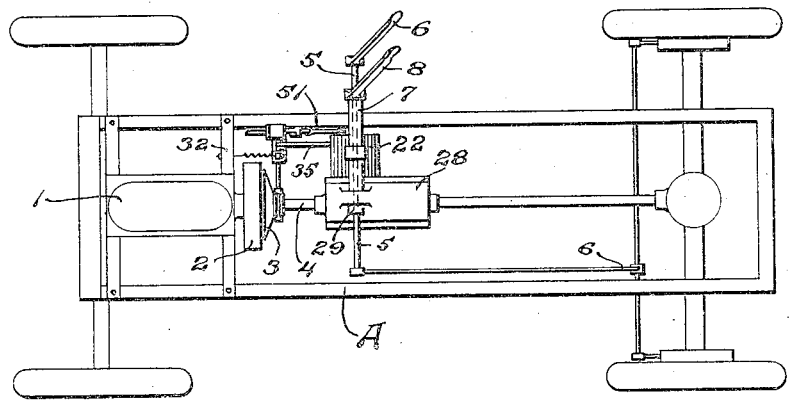
FIG. 3
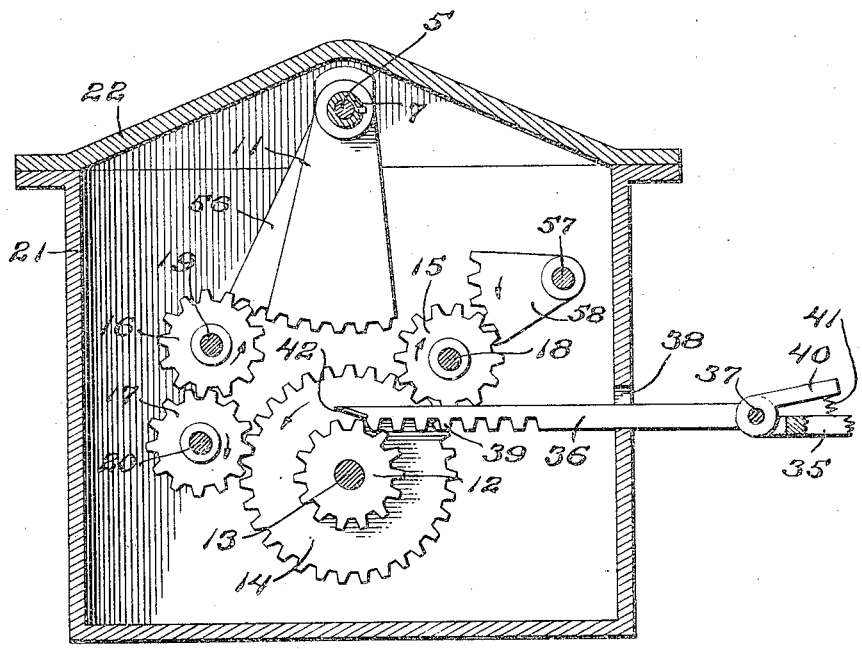
FIG. 6
Inventor
J. S. Groves, Jr.
Witnesses

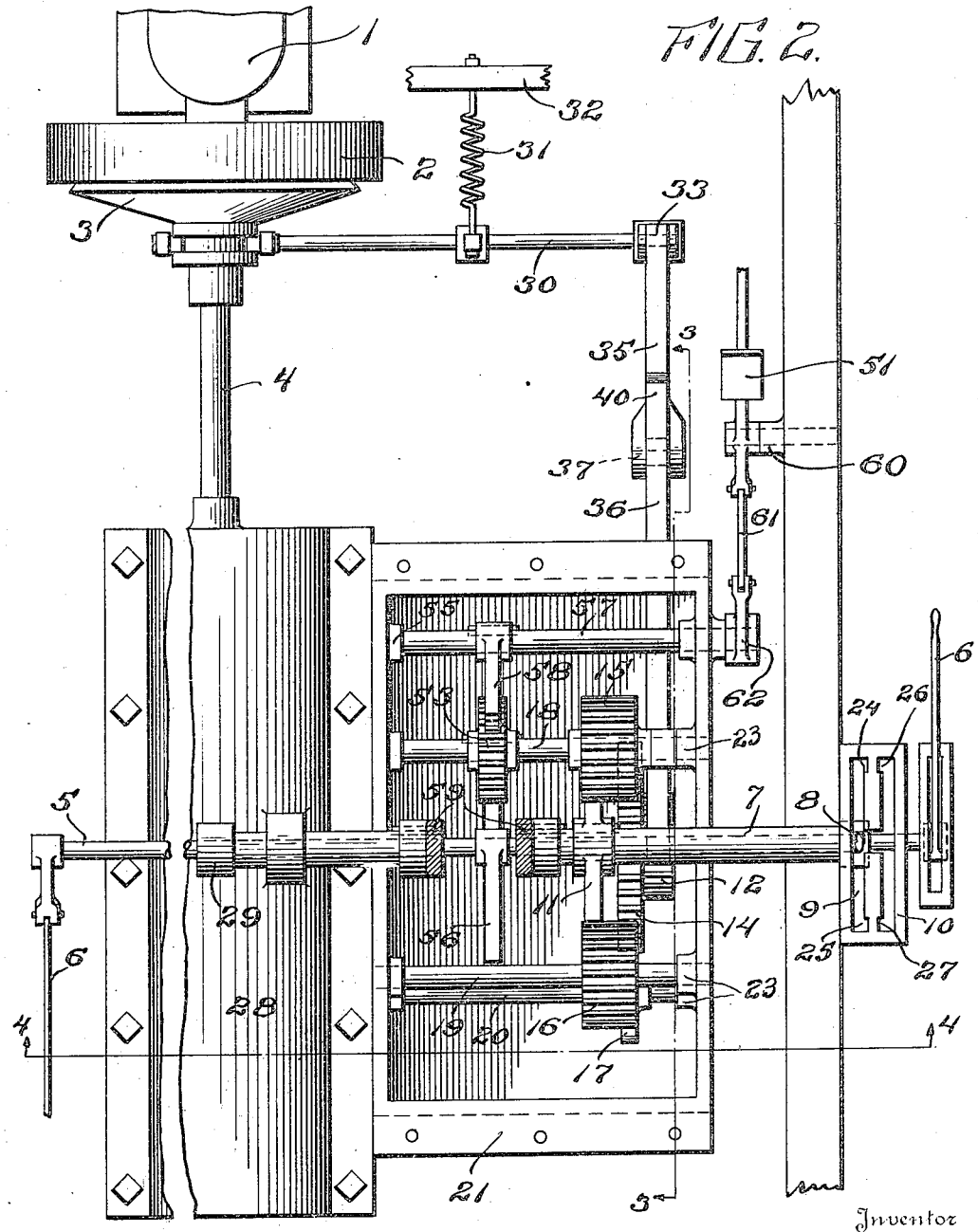

J. S. GROVES, Jr.
AUTOMATIC CLUTCH RELEASE FOR MOTOR VEHICLES.
APPLICATION FILED JUNE 25, 1915. RENEWED SEPT. 18, 1917.

1,259,228.

Patented Mar. 12, 1918.
3 SHEETS—SHEET 3.

Witnesses
A. M. Frogner

Inventor
J. S. Groves, Jr.
By Frank Fuller
Attorney

UNITED STATES PATENT OFFICE.

JAMES S. GROVES, JR., OF ALEXANDRIA, VIRGINIA, ASSIGNOR OF ONE-HALF TO JAMES S. GROVES, SR., OF ALEXANDRIA, VIRGINIA.

AUTOMATIC CLUTCH-RELEASE FOR MOTOR-VEHICLES.

1,259,228.     Specification of Letters Patent.     Patented Mar. 12, 1918.

Application filed June 25, 1915, Serial No. 36,197. Renewed September 18, 1917. Serial No. 192,035.

*To all whom it may concern:*

Be it known that I, JAMES S. GROVES, Jr., a citizen of the United States, residing at Alexandria, in the county of Alexandria and State of Virginia, have invented certain new and useful Improvements in Automatic Clutch - Releases for Motor - Vehicles, of which the following is a specification.

My invention relates to an automatic clutch-release mechanism for automobiles or self-propelled vehicles and particularly to mechanism to automatically shift, disengage or withdraw the clutch device which coöperates with the main shaft of the driving engine and the power shaft driven thereby, in order to increase the degree of safety in operating the vehicle, prevent the stripping of transmission gears and the choking of the engine when the automobile brakes are applied, upon shifting the elements of the transmission mechanism.

The main object of the invention is to provide an effective, durable and inexpensive means to render the clutch inoperative to drive the power shaft during shifting of the gears of the transmission mechanism or the application of the brakes, or operating parts thereof.

Further the invention aims to provide a construction wherein the said main object will be attained automatically during the said shifting action of the transmission gears or the application of the brake levers or pedals.

Still further, the invention is designed to provide a construction wherein the parts may, in addition to being built simultaneously with and into an automobile, serve as an attachment to present constructions of automobiles, and the invention resides in the details of construction, combination and arrangement of the parts hereinafter described with reference to accompanying drawings illustrating my preferred embodiment, and wherein:—

Figure 1 is a diagrammatic top or plan view of an automobile chassis having my improvements incorporated therein;

Fig. 2 is an enlarged plan or top view, partly broken away, illustrating my improvement in connection with associated parts of an automobile;

Fig. 3 is a cross sectional view on the line 3—3 of Fig. 2, but with the gearing casing having its cover in position;

Fig. 6 is a detail view illustrating a modified form of shifting mechanism for the automobile clutch.

Figure 4:
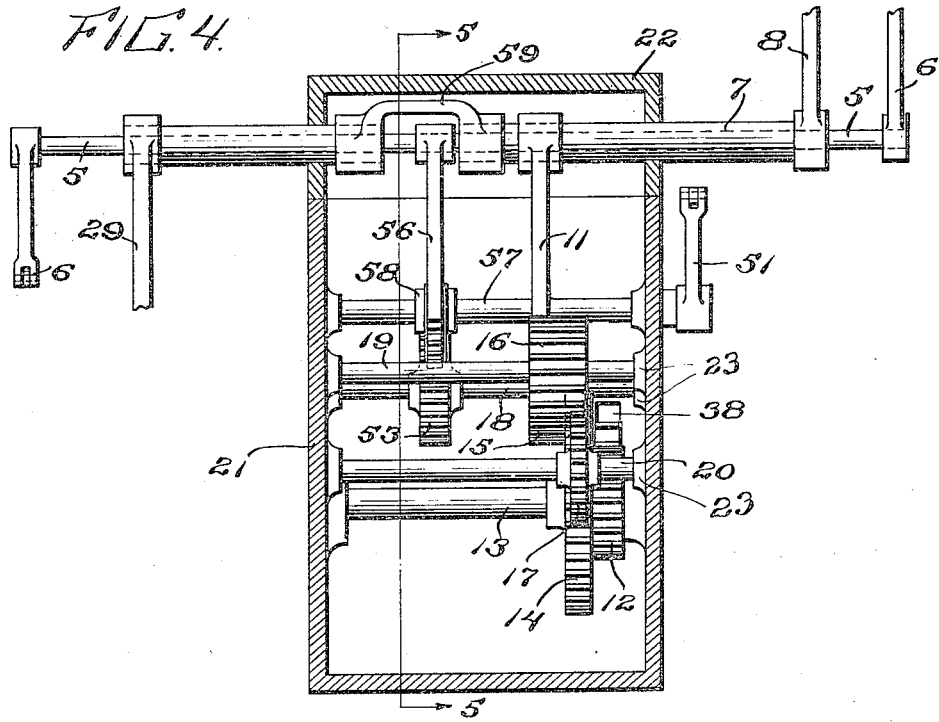
Fig. 4 is a cross sectional view on the line 4—4 of Fig. 2, but with the transmission box omitted.
Figure 5:
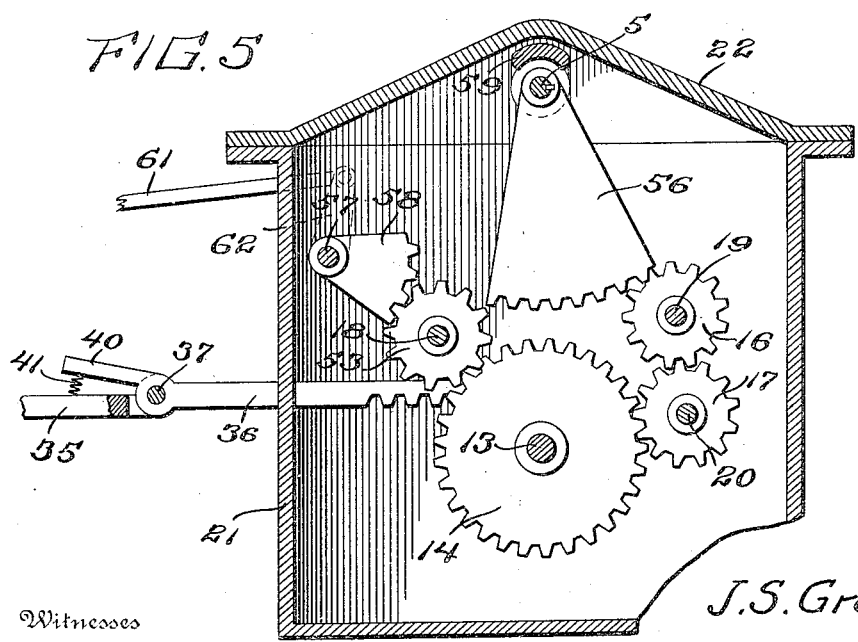
Fig. 5 is a cross sectional view on the line 5—5 of Fig. 4.

Referring specifically to the drawings, and first to Fig. 1, the invention has been illustrated in connection with a diagrammatic view of an automobile as at A. Since the invention is capable of practice in connection with practically all types of automobiles, specific description of the automobile will be omitted except in so far as the parts thereof coöperate with my improvements. It should be mentioned that the propelling engine of the vehicle is shown at 1 in connection with its fly-wheel 2 which serves as part of a clutch at its side and which clutch is completed by a clutch member or head 3 mounted on a shaft 4 which operates the transmission mechanism and which clutch head is connected in any suitable manner with the shaft 4 so as to slide thereon but so as to turn therewith and when in engagement with the fly-wheel 2 so as to drive the transmission from the engine 1.

My improvements particularly coöperate with a rotatable or rock shaft 5 through the operation of which brake mechanism such as 6 is brought into braking relation with the rear wheels of the automobile. The usual operating lever for rocking shaft 5 is shown at 6. Also as usual, a sleeve device 7 is slidably mounted on the shaft 5 and is adapted to be rocked by means of a lever 8 which coöperates with and moves in a substantially H-shaped slot 9 of a guide bracket 10 as is clear from Fig. 2. On the slidable and rotatable sleeve 7 is keyed a gear segment 11.

From the gear segment 11, it is designed to drive a shifting member such as a gear wheel or pinion 12 always in the same direction to disengage the clutch 2—3 when a shaft 13 to which it is keyed, is turned through movement of the segment and associated gearing.

As seen in Fig. 3, the shaft 13 also has keyed thereto a gear wheel 14 with which meshes a gear wheel 15 at times adapted to mesh with the segment 11. In addition, a gear wheel 16 is adapted, at suitable times, to mesh with the teeth or segment 11 and further gear wheel 16 at all times meshes with the teeth of an intermediate gear wheel 17 which, in addition, always meshes with the gear wheel 14. The gear wheels 15, 16 and 17 may be keyed or otherwise rigidly fixed on shafts 18, 19 and 20, respectively. Shaft 5 and sleeve 7 are suitably journaled in side walls of a casing or gear box 21 having a removable cover 22. Also the side walls of casing 21 are provided with suitable bearings 23 in which the shafts 18, 19, 20 and 13 are journaled.

In the drawings, Fig. 2, the positions which lever 8 assumes in H-shaped slot 9 when in "reverse" position, "first speed" position, "second speed" position and "third speed" position, are indicated at 24, 25, 26 and 27 respectively. When the lever 8 is shifted and moves segment 11 into engagement with the pinion 16, the transmission mechanism in the usual transmission box 28 is shifted to "second speed" and "reverse" positions through the medium of a gear shift lever 29 shown best in Figs. 2 and 4. As gear wheel 16 is turned, it imparts its motion to the intermediate gear wheel 17 which drives the gear wheel 14 in the direction of the arrow and in addition drives shaft 13 and gear wheel or pinion 12 thereon. Also when the lever 8 is so operated that the segment 11 meshes with the gear wheel 15, and the lever 8 is in position where the transmission is placed in "first speed" and "third speed" positions, gear wheel 14 is driven in the same direction as it is driven from shaft 19 and its gear wheel 16. It will be noticed that the gear wheels 15 and 16 are rather wide and this construction is for the purpose of insuring mesh of pinion 11 with the gear wheels in the different positions of shaft or sleeve 7 effected through sliding movement imparted through actuation of lever 8.

The above is one form of gear shift with which my improved mechanism for disengaging the clutch may be practised. Clutch head 3 has connected to its collar an arm 30 which slides with the clutch against the tension of a spring 31 connected to a part of the chassis designated 32, but which connection between arm 30 and the collar of clutch head 3 permits the clutch head 3 to turn. Connected at 33 to the shaft 30 is a shifting arm which, together with arm or shaft 30, I will term the shifting device for the clutch and which shifting arm has two sections 35 and 36 pivotally connected together at 37. Arm 36 extends through an enlarged opening 38 in one wall of casing 21 and is provided with rack teeth 39 to mesh with the teeth of pinion 12. Arm 36 has an angle arm 40 between which and arm 35, a spring 41 is disposed to normally maintain the arm section 36 in its lowermost position with teeth 39 in engagement with those of pinion 12. As previously stated, gear wheel or pinion 12 always turns in the same direction and therefore regardless of the gears operated by segment 11, the gear wheel 12, through mesh with teeth 39, slides the arm 34 and accordingly slides arm 30 against the tension of spring 31 and slides clutch head 3, disengaging it from the remainder of the clutch which is the flywheel 2. It will be noticed that this disengagement occurs each time the gears are shifted.

When gear wheel 12 turns in the direction reverse to that indicated by the arrow, it does not slide the arm 34, but its teeth coöperate with the arm section 36 to move it in a vertical plane from pivot 37 to prevent disruption of the parts. The arm section 36 is preferably provided with a sound absorber in the nature of a gutta percha section 42. When an arm section 36 descends, the sound absorber 42 engages the outer ends of the teeth of the gear wheel 12 and prevents undue noise occurring.

Since the clutch shifting device or means forms a very essential feature of my invention, it is to be understood that changes in the details thereof may be resorted to within the scope and spirit of appended claims.

For instance, gear wheel 12 may be dispensed with and as shown in Fig. 6, gear wheel 14 have a pitman 43 pivoted thereto at 44. Pitman 43 may be connected to the arm section 35 by means of links 45 pivoted together at 46 and to parts 43 and 35 at 47 and 48. In addition, the links are provided with studs 49 which are joined by a coil spring 50 tensioned to normally draw the studs 49 toward each other. This flexible connection accommodates the movement of pitman 43 and its proper operation of arm section 35 and accordingly of the clutch head 4.

In some instances it may be desired to release the clutch 2—3 by means of a pedal like the usual brake-applying pedal 51. To accomplish this end, a gear wheel 53 is fixed on the shaft 18 with which a segmental gear wheel 56 somewhat larger than the segmental gear wheel 11 meshes at suitable times and which segmental gear wheel 56 is keyed to the shaft 5. Brake lever pedal 51 is journaled on a stub shaft 60 supported from a suitable part of the chassis and pivoted to a link 61, in turn pivoted to a crank 62 fast on shaft 57 exteriorly of casing 1. Bearings 55 of the casing 21 journal shaft 57. On shaft 57 is keyed a segmental gear wheel 58 adapted to mesh with gear wheel 53 and impart motion thereto and to shaft 18 upon adjustment of the brake-actuating pedal. From shaft 18, motion is imparted by gear wheels 14 and 15 to shaft 13, to gear wheel 12 and then to the clutch-shifting device. Where segment 8 is keyed on shaft 5, the sleeve 7 is arched at 59 to provide the necessary clearance. When lever 6 is operated, it will, of course, shift the segment 56 so as to bring it into mesh with the proper gear wheels or pinions at each operation so as to disengage the clutch 2—3.

In addition to reserving the right to make the modifications with respect to the clutch-shifting means, it is to be understood that changes may be resorted to in the general construction of the improvements provided they fall within the spirit and scope of the appended claims.

I claim:

1. In combination with transmission mechanism and clutch means associated therewith, a driving member, an operating member, means to actuate the driving member in the same direction through movement of the operating member in a plurality of directions, and means to shift the clutch means through operation of the driving member.

2. In combination with transmission mechanism and a clutch means associated therewith, a turnable member, means to turn said member in opposite directions, a second turnable member, means to drive the second turnable member in the same direction through movement of the first turnable member in opposite directions, and means to release the clutch means through operation of the second turnable member.

3. In combination with transmission mechanism and clutch means associated therewith, a turnable member, gearing operable to turn said member, second gearing operable to turn said member, both sets of gearing adapted to turn the said member in the same direction, gearing means engageable with both sets of gearing to drive the same and accordingly drive the turnable member, and means movable through operation of the turnable member to release said clutch.

4. In combination with transmission mechanism and a clutch means associated therewith, a first gear wheel, a second gear wheel, means to turn said gear wheels, a third or idler gear wheel, a fourth gear wheel, said fourth gear wheel meshing with said first gear wheel and idler gear wheel, and means to release the clutch means operable through movement of the fourth gear wheel.

5. In combination with transmission mechanism and clutch means associated therewith, clutch-releasing means, driving means, said driving means during movement in one direction operating the clutch-releasing means and permitting the clutch-releasing means to remain idle during movement in another direction.

6. In combination with transmission mechanism and clutch means associated therewith, a clutch-shifting device, driving means, said clutch shifting device including an arm, coöperating means on said driving means and said arm to drive the arm through movement of the driving means in one direction, and means permitting movement of the arm to enable said coöperating means to disengage upon movement of the driving means in another direction.

7. In combination with transmission mechanism, and clutch means associated therewith, means to release the clutch means including a gear wheel, said latter means including an arm, teeth on said arm to mesh with those of the gear wheel, said arm being movable relative to the gear wheel so that the said teeth may disengage, and means to yieldingly maintain said arm in position with its teeth in engagement with said gear wheel.

8. In combination with transmission mechanism, and clutch means associated therewith, said transmission mechanism including a shaft, means slidable through turning movement of the shaft, and means to release the clutch means through the actuation of the slidable means.

9. In combination with transmission mechanism and a clutch means associated therewith, a turnable member operable through movement of the transmission mechanism, means to release the clutch means through movement of said turnable member, said means to drive the turnable member being substantially in the form of a sleeve, a shaft journaled within the sleeve, and means to drive said turnable member through movement of said shaft.

10. In combination with braking mechanism and an operating lever thereof, transmission mechanism operable at a plurality of adjustments, power means, a clutch controlling the operation of said transmission mechanism from the power means, and means operable through movement of the transmission mechanism, upon shifting said lever to release the clutch during each change of adjustment.

In testimony whereof I affix my signature in the presence of two witnesses.

JAMES S. GROVES, Jr.

Witnesses:
E. H. McLACHLEN,
B. D. FULLER.